(12) United States Patent
Agtuca (10) Patent No.: US 7,969,035 B2
(45) Date of Patent: Jun. 28, 2011

(54) EXHAUST GAS ELECTRIC GENERATION APPARATUS AND METHOD

(76) Inventor: Peter Agtuca, Auburn, WA (US)

( * ) Notice: Subject to any disclaimer, the term of this patent is extended or adjusted under 35 U.S.C. 154(b) by 423 days.

(21) Appl. No.: 12/228,316

(22) Filed: Aug. 11, 2008

(65) Prior Publication Data

US 2009/0045630 A1  Feb. 19, 2009

Related U.S. Application Data

(60) Provisional application No. 60/964,404, filed on Aug. 9, 2007.

(51) Int. Cl.
*F03B 13/00* (2006.01)
(52) U.S. Cl. .................. 290/54; 290/52; 310/156.37
(58) Field of Classification Search .................. None
See application file for complete search history.

(56) References Cited

U.S. PATENT DOCUMENTS

| | | | |
|---|---|---|---|
| 237,986 A | 2/1881 | Mansfield | |
| 695,524 A | 3/1902 | Woodell | |
| 1,013,798 A | 1/1912 | Messina | |
| 1,434,916 A | 11/1922 | Seymour | |
| 3,187,191 A | 6/1965 | Baggs | |
| 3,720,840 A | 3/1973 | Gregg | 290/55 |
| 3,944,840 A | 3/1976 | Troll | 290/55 |
| 4,012,163 A | 3/1977 | Baumgartner et al. | 415/2 |
| 4,186,312 A | 1/1980 | Dvorak | 290/4 |
| 4,406,579 A | 9/1983 | Gilson | 415/2 |
| 4,731,545 A | 3/1988 | Lerner et al. | 290/54 |
| 5,512,788 A | 4/1996 | Berenda et al. | 290/55 |
| 5,977,684 A * | 11/1999 | Lin | 310/268 |
| 6,655,907 B2 * | 12/2003 | Brock et al. | 415/4.2 |
| 6,659,723 B2 | 12/2003 | Bankstahl | 416/185 |
| 6,765,309 B2 | 7/2004 | Tallal, Jr. et al. | 290/55 |
| 6,784,562 B2 * | 8/2004 | Gennesseaux | 290/2 |
| 7,200,005 B2 | 4/2007 | Von Gutfeld et al. | 361/695 |
| 7,400,069 B2 * | 7/2008 | Kundel | 310/20 |
| 7,466,049 B1 * | 12/2008 | Vancea | 310/75 C |
| 7,482,722 B2 * | 1/2009 | Lin | 310/83 |
| 7,841,306 B2 * | 11/2010 | Myers et al. | 122/406.5 |
| 2003/0234587 A1 * | 12/2003 | Sjoberg | 310/67 R |
| 2006/0244320 A1 * | 11/2006 | Guo et al. | 310/68 B |

* cited by examiner

*Primary Examiner* — Michael C Zarroli
(74) *Attorney, Agent, or Firm* — Dean A. Craine (57) ABSTRACT

An apparatus for generating electricity from a relatively low velocity exhaust produced by a piece of machinery. The apparatus includes a fan assembly located inside a frame mounted adjacent to the exhaust vent found on the piece of machinery. The fan assembly includes a plurality of fixed vanes that extend transversely into the exhaust gas. The ends of the vanes are attached to two side plates that rotate freely around the frame's center axis. Attached to the inside side plate is an outer housing with two magnetic plates mounted therein. The two magnetic plates are spaced apart thereby forming a gap in which a stator disc with a plurality of coil members is formed. The stator disc is fixed to an axle that is longitudinally aligned with the center axis of the outer housing and the fan assembly. During operation, the exhaust gas causes the fan assembly and the outer housing to rotate. Because the stator disc is stationary, an electric current is produced in the stator disc as the two magnetic discs rotate around it. The current is then transmitted to a rectifier and inverter for local use or transmission to a utility grid.

6 Claims, 10 Drawing Sheets

EXHAUST GAS ELECTRIC GENERATION APPARATUS AND METHOD

This is a utility patent application which claims benefit of U.S. Provisional Application No. 60/964,404 filed on Aug. 9, 2007.

BACKGROUND OF THE INVENTION

1. Field of the Invention

This invention relates to exhaust energy recovery systems, and more particularly to such systems specifically designed to be used with low velocity exhaust systems.

2. Description of the Related Art

Manufacturing buildings typically have exhaust vents mounted on the sides or roofs through which exhaust gas, dust and smoke produced by machinery located inside the building is expelled into the outside atmosphere. Large blowers on the machinery located in the building force exhaust gas, dust and smoke outward through intervening duct works exhaust vents. In order for the large blowers to operate efficiently, it is important that the correct size and shape of the ducts and exhaust vents be used to prevent excess back pressure.

In many manufacturing buildings, the large blowers on machinery operate 24 hrs a day and 7 days a week. An electric generation apparatus the enable owners or tenants to partially recover the energy from the exhaust gas and does not generate excessive back flow pressure that may damage the blowers would be highly desirable.

SUMMARY OF THE INVENTION

Accordingly, these and other objects of the invention are met by an apparatus for generating electricity from relatively low velocity exhaust produced by a piece of machinery disclosed herein. The apparatus is specifically designed to be added to an existing building's duct work and create little or no back flow pressure.

The apparatus includes a fan assembly and a low velocity generator assembly located inside a frame mounted at a location adjacent to the exhaust port on a piece of machinery that generates relatively low velocity exhaust. The fan assembly includes a plurality of fixed vanes coaxially aligned around the frame's center axis. The opposite ends of the vanes are attached to two parallel sides plates designed to rotate freely around the frame's center axis. The frame is mounted at a location adjacent to the exhaust port so that exhaust gas flows into one side of the fan assembly and perpendicular to the vanes thereby causing the fan assembly to rotate.

Attached to the inside side plate and coaxially aligned with the center axis of the fan assembly is a cylindrical outer housing used with the generator assembly. By attaching the inside side plate to one end of the outer housing, the fan assembly and outer housing rotate as one unit when exhaust gas flows through the frame. Located inside the outer housing are two magnetic discs. The two magnetic discs are affixed to the opposite end walls of the outer housing and are spaced apart thereby forming a center gap inside the outer housing. Each magnetic disc includes a plurality of permanent magnets radially aligned on a flat steel disc body. The magnets on each magnetic disc are aligned so that their polarity are opposite each other and face inward. The magnetic discs are oriented coaxially aligned around bearings mounted on a center axle that extends through the outer housing.

Located inside the center gap formed between the two magnetic discs is a stationary stator disc with a plurality of looped coil members radially aligned and embedded therein. There are three groups of looped coil members that are serially connected to form three alternating currents. When the magnetic discs are rotated around the stator disc, the three wires are then connected to the three groups of coil members and extend through the together to create a three phase A.C. electric current. The three wires can also be connected to a rectifier to create a D.C. circuit.

During operation, the flow of exhaust gas through the frame causes the fan assembly, the outer housing and the two magnetic discs located therein to rotate around the stator disc. As the two magnetic discs rotate around the stator disc, a three phase A.C. electric current is produced which is then transferred to an external rectifier and inverter. The current is then delivered to a load center where there it is distributed to the facility or to the utility power grid.

As an optional feature, a means for cooling the stator disc may also be provided to reduce heat build up.

Also, an optional gear box assembly may be provided between the fan assembly and the generator assembly which enables the operator to adjust the gear ratio between the fan assembly and the generator assembly.

Because the vanes are perpendicularly aligned to the direction of flow of the exhaust gas from the machinery and because the generator assembly is not located in the direct flow of the exhaust gas, and backflow pressure created by the apparatus is minimized.

DESCRIPTION OF THE PREFERRED EMBODIMENT(S)

Figure 1:
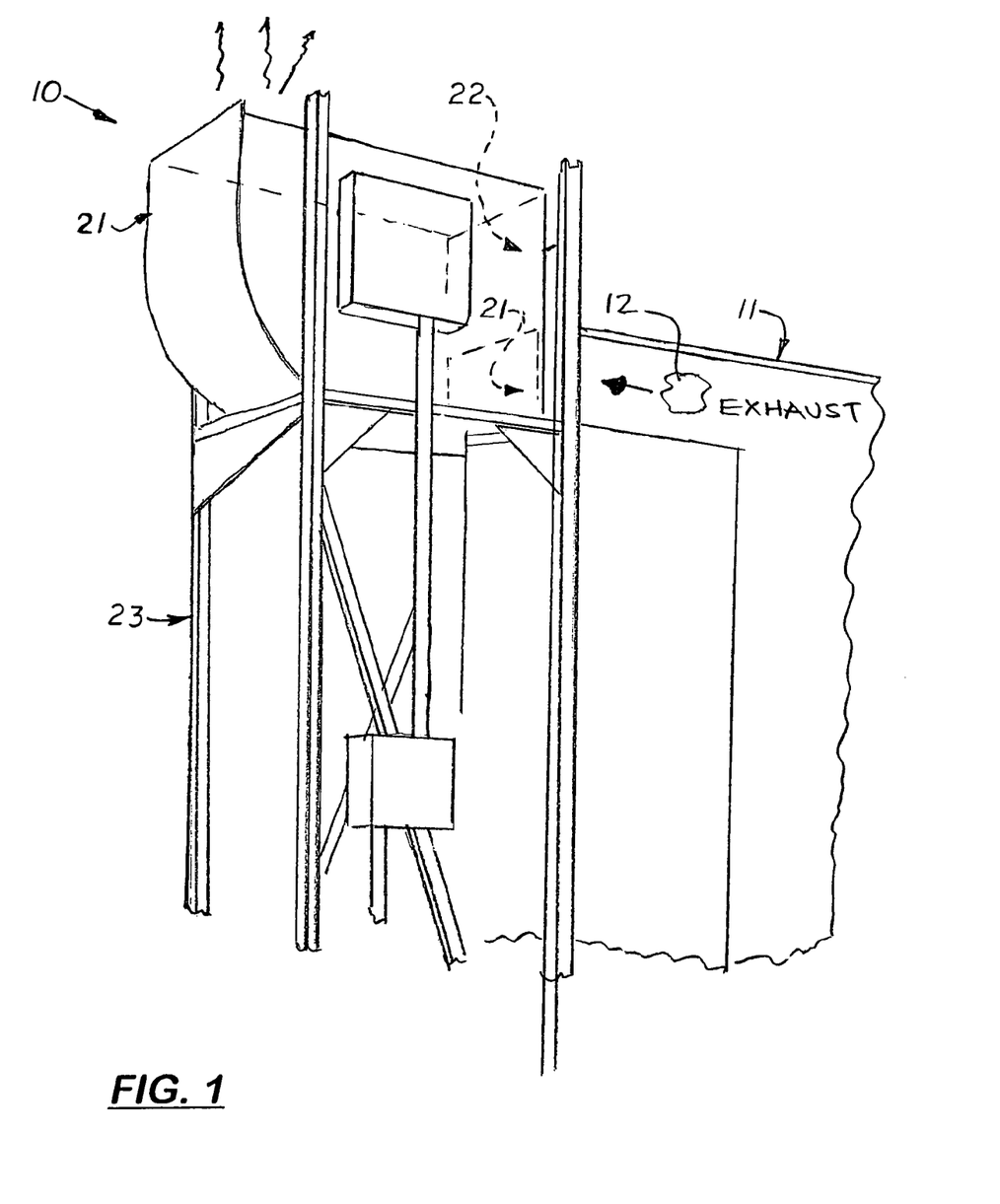
FIG. 1 is a perspective view of the apparatus assembled on a frame positioned adjacent to the exhaust vent on a piece of machinery that produces a large volume of low velocity exhaust gas.
Figure 2:
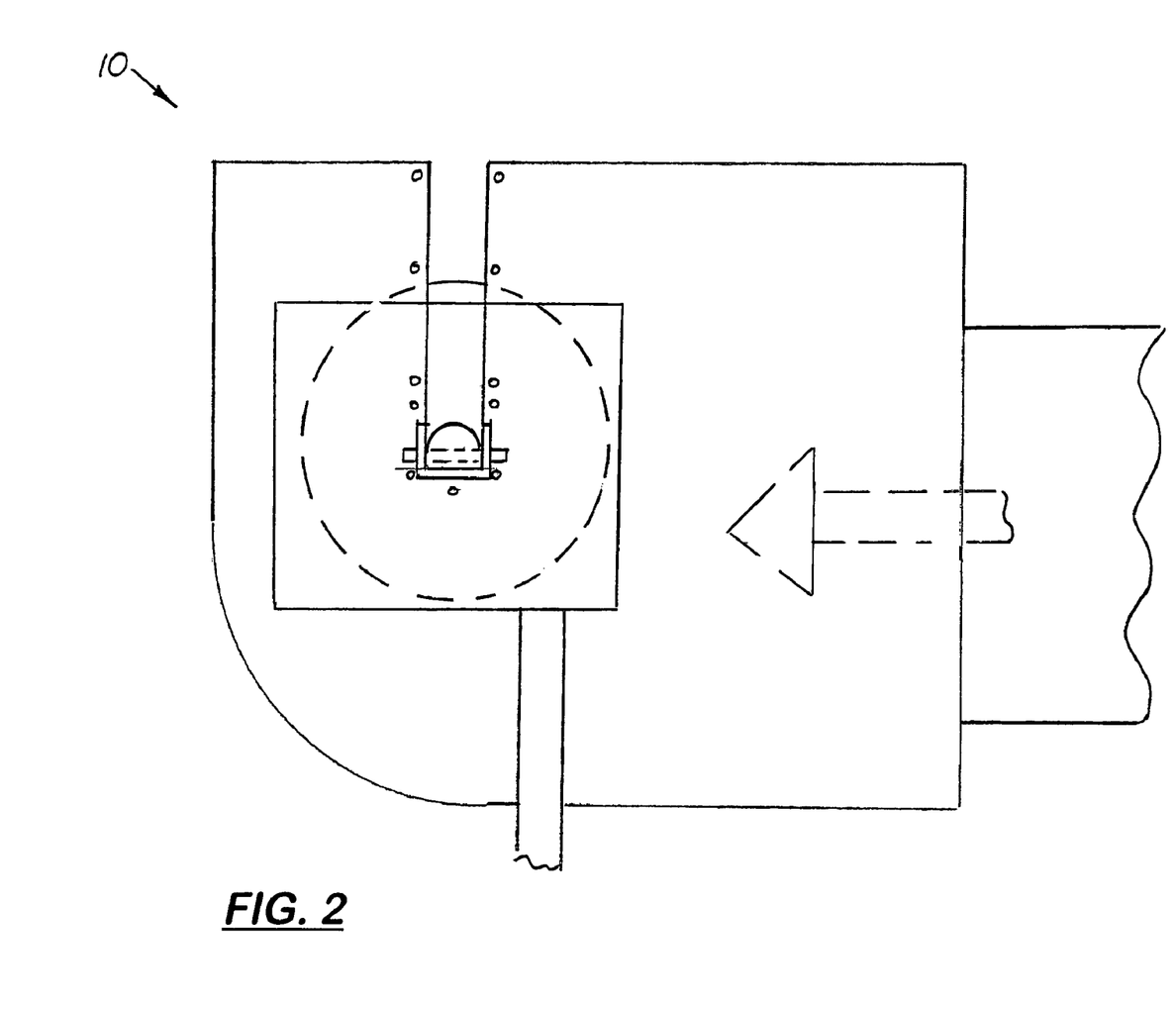
FIG. 2 is a side elevational view of the frame and the generator assembly mounted therein showing.
Figure 3:
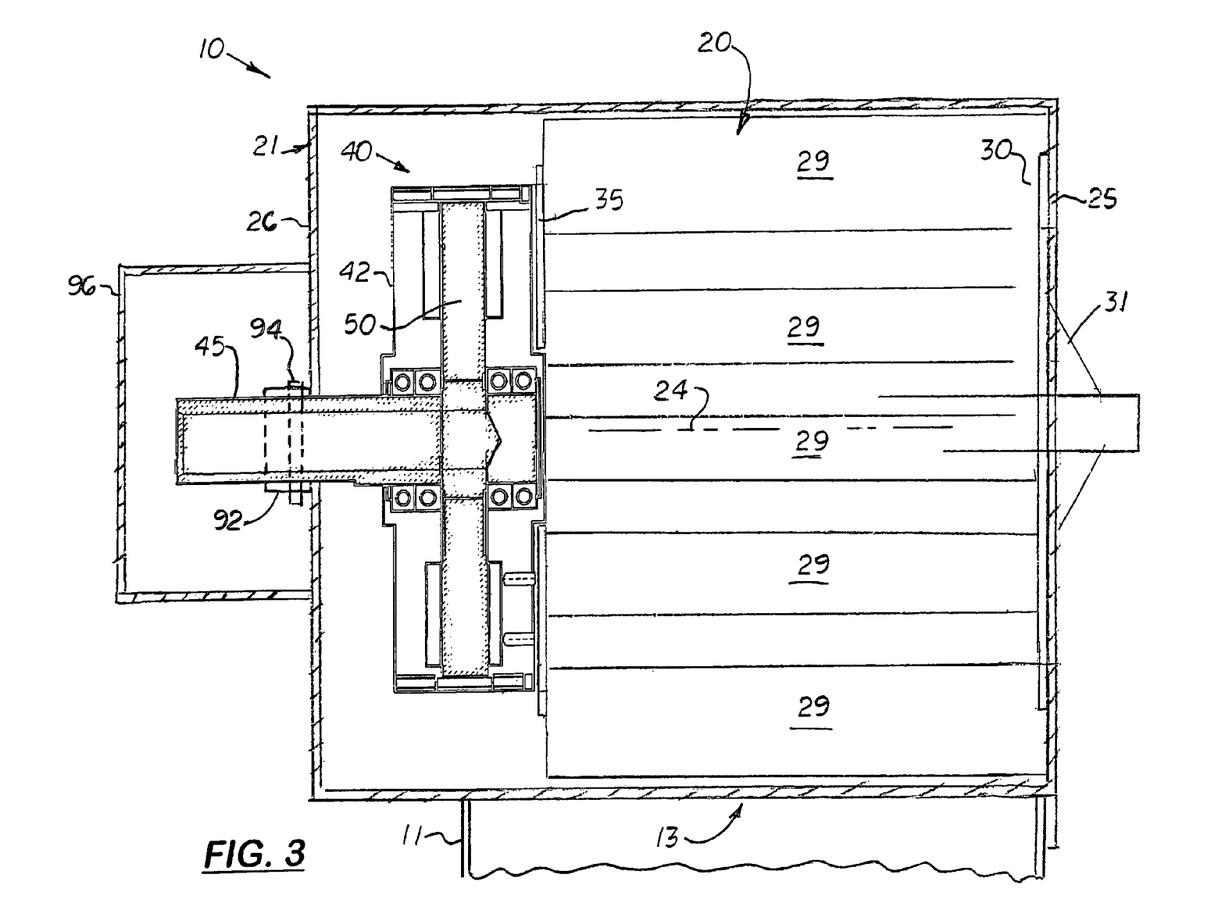
FIG. 3 is a sectional top plan view of the apparatus shown the relative positive of the fan assembly and the generator assembly located in the frame.
Figure 4:
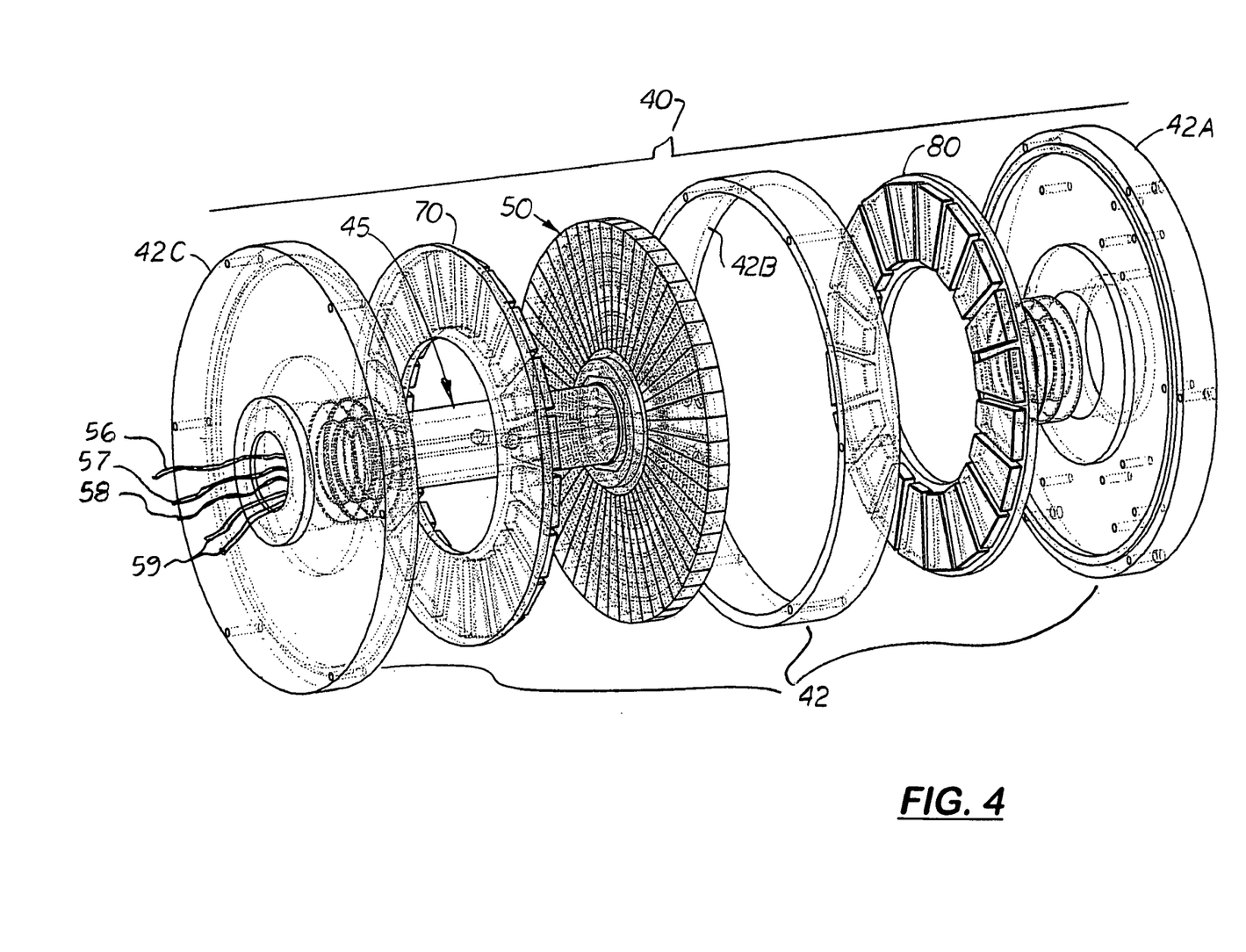
FIG. 4 is an exploded view of the generator assembly.
Figure 5:
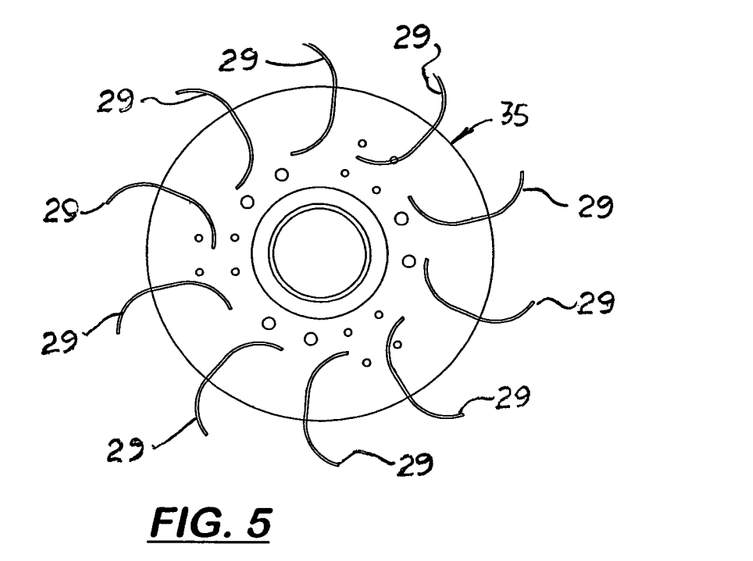
FIG. 5 is a side elevational view of a side plate on the fan assembly showing the curvature and orientation of the vanes mounted on a side plate.
Figure 6:
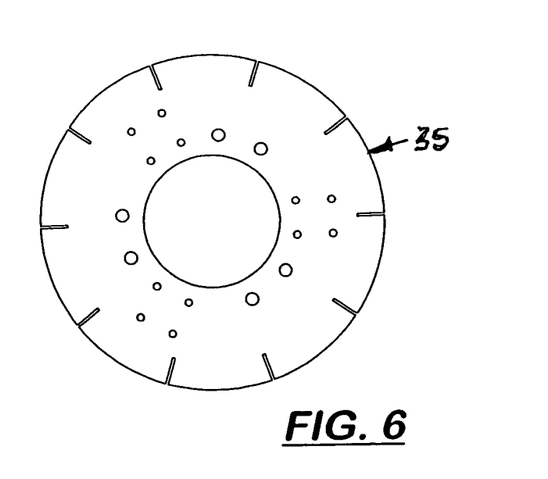
FIGS. 6 and 7 are side elevational views of the inside and outside side plates used on the fan assembly with the vanes removed.
Figure 7:
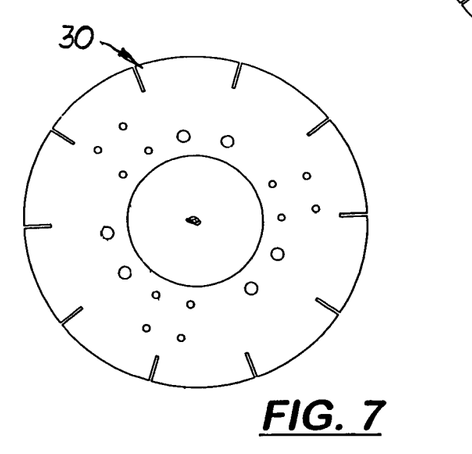

Referring to the FIGS. 1-13, an apparatus 10 for generating electricity from relatively low velocity exhaust 13 produced by a piece of machinery 11 is shown and described. The apparatus 10 includes a fan assembly 20 located inside a rigid frame 21 mounted adjacent to the exhaust exit port 12 on the piece of machinery 11. As shown in FIG. 1, the frame 21 may be mounted on a secondary support structure 23 so that the input opening 22 to the frame 21 is properly aligned with the exhaust port 12 on the piece of machinery 11.

The fan assembly 20 includes a plurality of fixed vanes 29 coaxially aligned around the frame's center axis 24. The vanes 29 are rigidly attached to two circular side plates 30, 35 designed to rotate freely around the frame's center axis 24. In the preferred embodiment, the outside side plate 30 is mounted on a pillow block 31 located in a fixed position on the outside side wall 25 of the frame 21. The inside side plate 35 is securely attached to the inside plate 42A of the outer housing 42 of a generator assembly 40.

The generator assembly 40 includes a stationary drive axle 45 that extends laterally from the fan assembly 20 and attaches to the inside side wall 26 of the frame 21. Rotatably mounted on the drive axle 45 and inside the frame 21 is an outer housing 42. The drive axle 45 is coaxially aligned with the outer housing 42 and longitudinally aligned with the fan assembly's center axis 24. As mentioned above, the inside side plate 35 on the fan assembly 20 is attached to the inside plate 42A of the outer housing 42 thereby enabling the outer housing 42 and the fan assembly 20 to rotate as one unit.

Mounted on the drive axle 45 and located inside the outer housing 42 is a flat stator disc 50 on which a plurality of coil track loops 52, 53, 54 are radially aligned. In the preferred embodiment, there are three types of coil track loops 52, 53, 54 that are alternately aligned on the opposite sides of the stator disc 50. The three types of coil track loops 52, 53, 54 are serially connected together by three wires 55, 56, 57 that extend through the drive axle 45. The ends of the three wires 55, 56, 57 extend through the end of the drive axle 45 that extends through the outside plate 42C of the outer housing 42 and connect to a rectifier 130 discussed further below. With three wires 55, 56, 57, a three phase A.C. electric current is created when the outer housing 42 is rotated around the stator disc 50.

Figure 8:
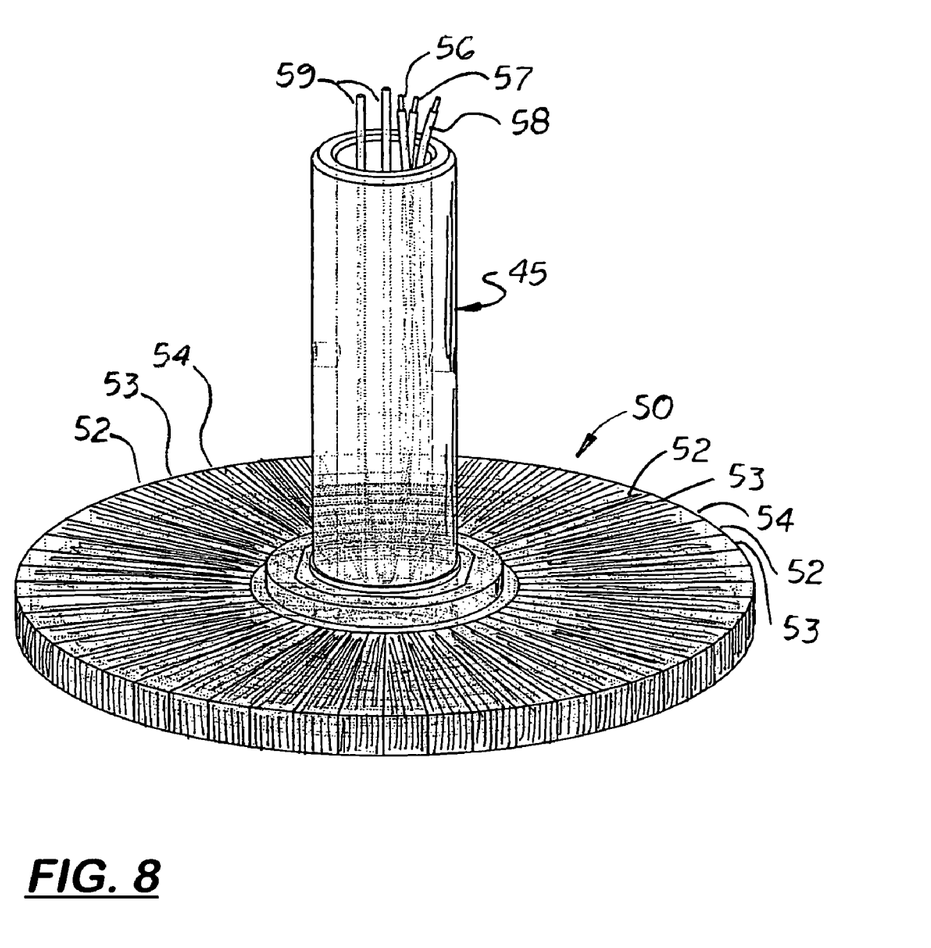
FIG. 8 is a perspective view of the stator disc.
Figure 9:
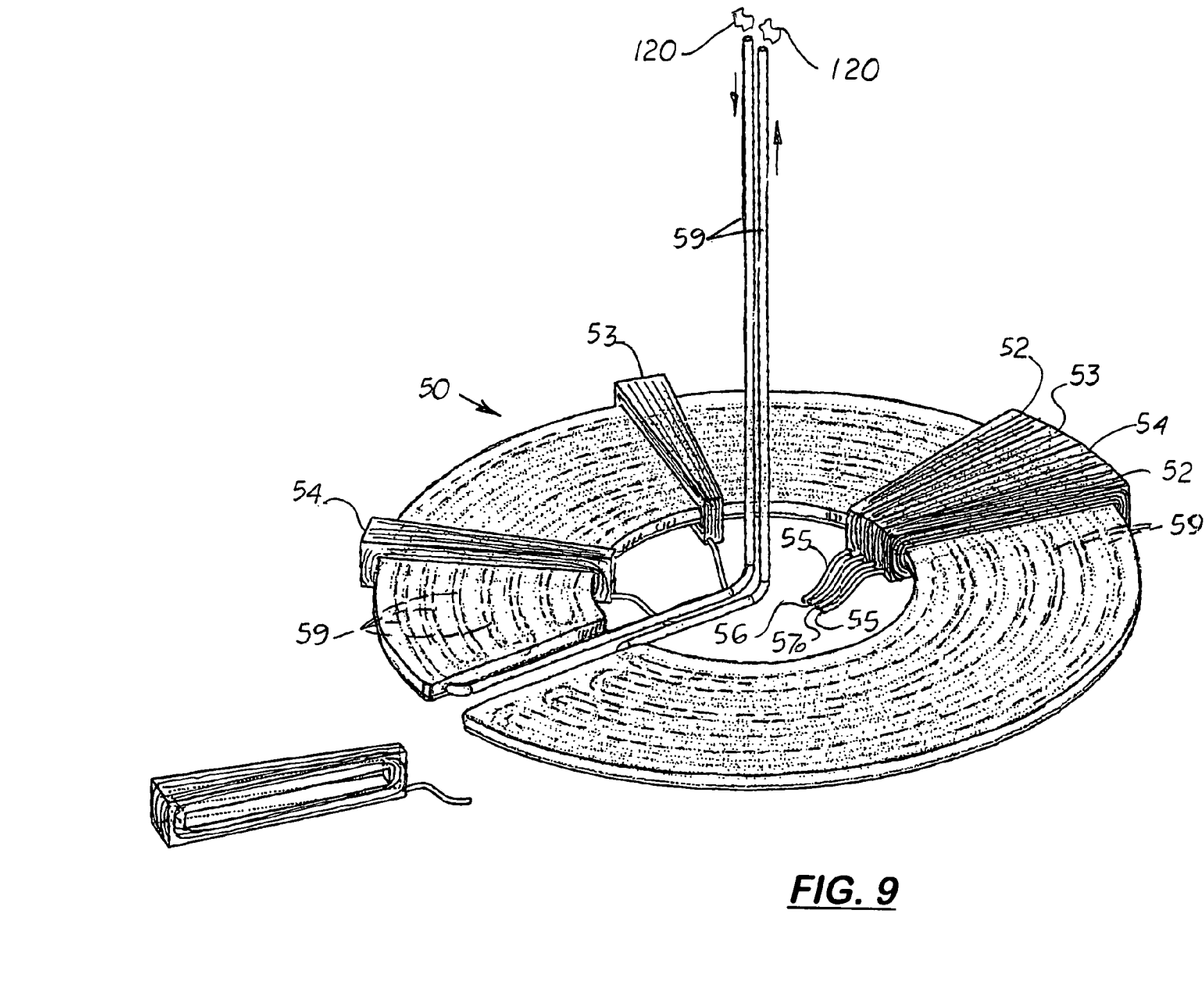
FIG. 9 is a partial, perspective view of the stator disc showing the relative position of the cooling disc and the outer windings.
Figure 10:
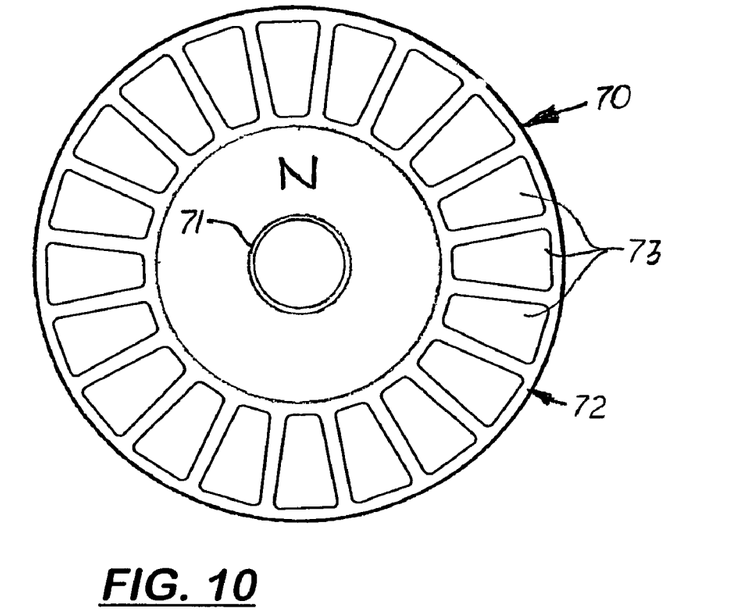
FIG. 10 is a front elevational view of the first magnetic disc with the plurality of plate magnets radically mounted thereon with the north pole facing outward.
Figure 11:
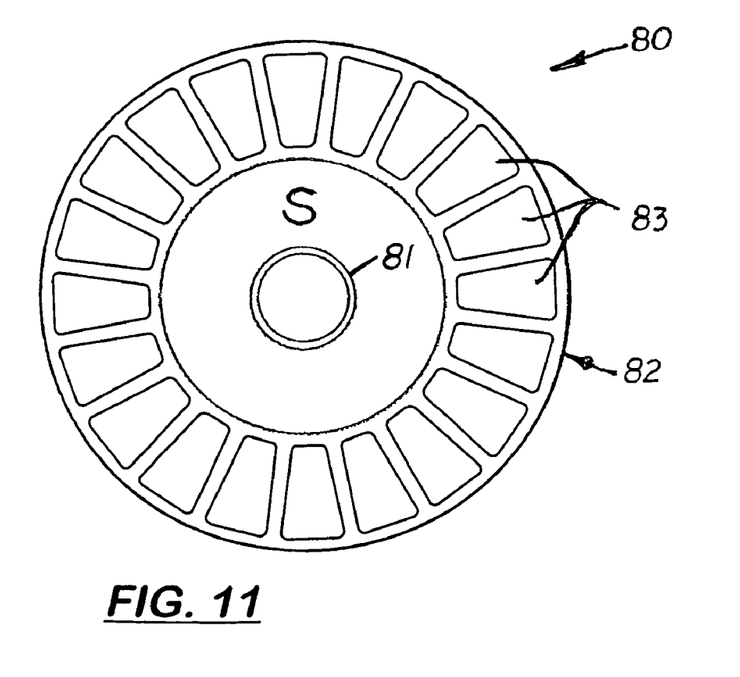
FIG. 11 is a front elevational view of the second magnetic disc with the plurality of plate magnets radially mounted thereon with the south pole facing outward.

In the preferred embodiment, the stator disc 50 is made of non-metallic material such as fiberglass. Each coil track loop 52, 53, 54 is made of copper which is radially aligned in the stator disc 50 as shown in FIGS. 8 and 9.

During operation, the stator disc 50 becomes hot. To reduce heat an optional feature, a means for cooling the stator disc 50 may also be provided. In the preferred embodiment, the means for cooling is a loop conduit 59 that is wound in a spiral configuration inside the stator disc 50 as shown in FIG. 9. During use, a coolant 120 flow continuously flows into the conduit 59 through the track loops 52, 53, 54 and then outward to a cooling radiator (not shown) to remove excess heat from the stator disc 50.

Fixed to the inside surfaces of the cylindrical housing 42 are two magnetic discs 70, 80. Each magnetic disc 70, 80 includes a coaxially aligned bearing 71, 81, respectively, through which the drive axle 45 extends to keep the two discs 70, 80 centrally aligned inside the outer housing 42. Each magnetic disc 70, 80 includes a steel disc body 72, 82, respectively, with a plurality of charged magnet pads 73, 83, respectively formed on its inside surface. Magnet pads 73 of the first magnetic disc 70 all have a North magnetic charge while the magnet pads 83 of the second magnet disc 80 all have a South magnetic charge.

The frame 21 is a partially enclosed, four sided box-shaped structure with two side walls 25, 26, a rear wall 27, and a bottom panel 28. Formed on each outside and inside side wall 25, 26 is a vertical slot 102 sufficiently wide to receive the drive axle 45 and pillow block, respectively. Welded to the outside side wall below the slot is a saddle bracket. During use, the distal of the drive axle 45 is placed into the slot 102 and over the saddle bracket 105. A pin 110 extends through a hole formed on the drive axle 45 and through holes formed in the saddle bracket 105 to hold the drive axle 45 in a fixed position on the the frame 21. Located over the outside side wall is a small dust cover 110.

During operation, the rotation of the fan assembly 20 by the flow of exhaust gas through the frame 21 causes the two discs 70, 80 located inside the outer housing 42 to rotate around the stator disc 50. As the two discs 70, 80 rotate around the stator disc 50, a three phase A.C. electric current is produced in the stator disc 50 which is then transferred via the three wires 55, 56, 57. In the preferred embodiment, the three wires 55, 56, 57 are connected to a rectifier 130 that modules and converts the A.C. current into a D.C. After converted into D.C. current, the current is then delivered to an inverter 140 which re-converts the D.C. current into A.C. current which can then be used or transmitted to an external utility electric grid 150.

In the preferred embodiment, the outer housing 42 is made of non-ferric material, such as aluminum. The two rotating magnetic discs 70, 80 are made of ferric material, such as steel. The stator disc 50 is made of a plurality of coil track loops 52, 53, 54 embedded in a thin disc made of lightweight insulation material, such as fiberglass.

Because the vanes 29 are perpendicularly aligned to the direction of flow of the exhaust gas and because the generator assembly is located outside the flow of the exhaust gas, and backflow pressure created by the apparatus 10 is minimized.

Figure 12:
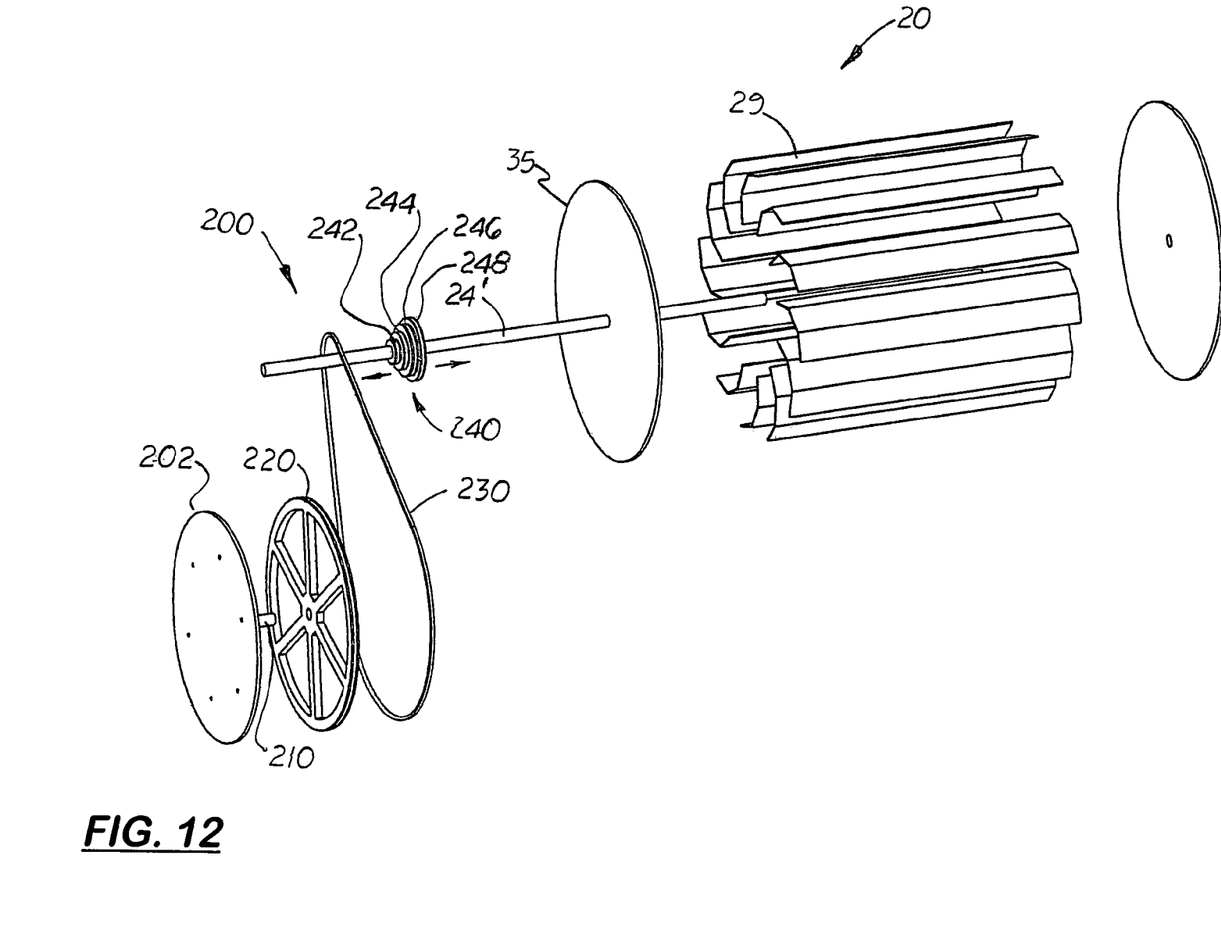
FIG. 12 is an exploded perspective view of an optional transmission assembly disposed between the fan assembly and the generator assembly.
Figure 13:
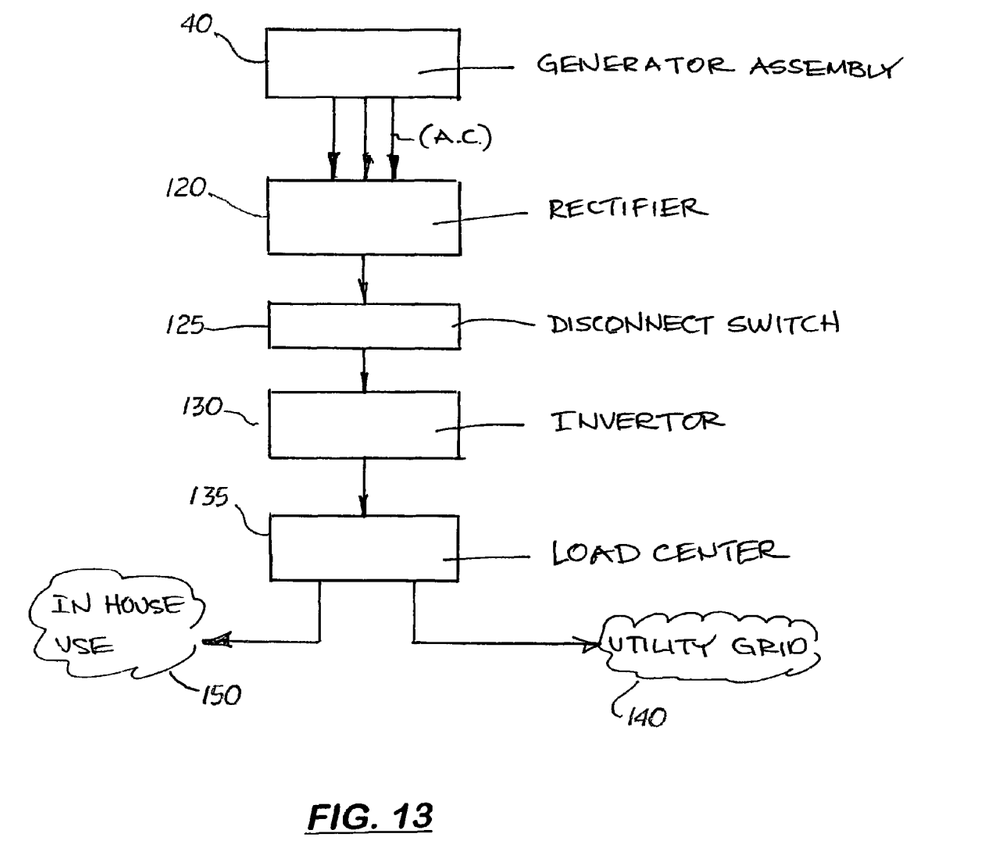
FIG. 13 is a flow chart showing the steps taken to utilize the electricity produced by the apparatus.

FIG. 12 is a perspective view of an optional gear box assembly 200 disposed between the fan assembly 20 and the generator assembly 40 that enables the operator to selectively adjust the turning ratio between the fan assembly 20 and the generator assembly 40. The gear box assembly includes a flat plate 202 that's attached to plate 42A (not shown) on the generator assembly 40. Formed on the flat plate is a stub 210 on which a large pulley 220 is affixed. Disposed around the pulley 220 is a belt 230 that extends around a multiple pulley hub 240 that is affixed to the end of an elongated axle 24' attached to the fan assembly 20. The multiple pulley hub 240 includes a plurality of increasingly larger diameter pulleys 242, 244, 246, 248. During use, the multiple pulley hub 240 is moved to different positions along the axle 24' so that the belt 230 may engage different diameter pulleys 242-248 on the pulley hub 240, the operator is able to adjust the rotation ratio of the fan assembly 20 to the generator assembly 40 so that electrical output is maximized and heat production is kept within normal limits.

Using the above described apparatus, a method for generating electricity from a relatively low velocity exhaust gas source is provided comprising the following steps:

a. selecting a piece of equipment that produces exhaust gas and delivers it through an exhaust vent;

b. selecting an exhaust gas electricity generator system that includes a fan assembly and a generator assembly coupled thereto, said fan assembly including two rotating discs and a plurality of vanes connected at their opposite ends to said discs, said fan assembly being mounted over the exhaust opening so that said vanes are aligned transversely to the direction of flow of the exhaust gas, said generator assembly including an outer housing with two magnetic flat discs surrounding a flat center stator disc, said stator disc includes a plurality of coil members in which an electric current is created when said magnetic discs are rotated around said stator discs;

c. mounting said exhaust gas electricity generator system over said exhaust vent so that the exhaust gas flows into said fan assembly and rotates said vanes;

d. connected said generator assembly to an electricity distribution system; and, e. activating said piece of machinery to produce exhaust that is converted into electricity.

In compliance with the statute, the invention described herein has been described in language more or less specific as to structural features. It should be understood however, that the invention is not limited to the specific features shown, since the means and construction shown is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. An apparatus for generating electricity from relatively low velocity exhaust gas produced by a piece of machinery, said piece of machinery includes an exhaust port through which exhaust gas is expelled, said apparatus includes:

a. a fan assembly mounted adjacent to the exhaust port through which exhaust gas from a piece of machinery is expelled, said fan assembly includes two rotating discs with a plurality of fixed vanes coaxially aligned inside said fan assembly; and, b. a low RPM generator that includes a cylindrical outer housing attached to at least one said rotating side plate on said fan assembly, said generator includes a center axle with a stationary stator disc aligned therewith, said stator disc including a plurality of coil members radially aligned and embedded therein, said coil members being serially connected together with wires that extend into said center axle, said generator also including two magnetic discs located inside said outer housing and coaxially aligned with said stator disc, each said magnetic disc having a plurality of magnets mounted on its inside surface, said magnets on said magnetic disc having opposite polarities so that when said fan assembly rotates, an electric current is produced in said stator disc.

2. The apparatus, as recited in claim 1, further comprising a means for cooling said stator disc.

3. The apparatus, as recited in claim 2 wherein said means for cooling said stator disc is a cooling disc disposed within said stator disc filled with a re-circulated liquid coolant.

4. The apparatus, as recited in claim 1, wherein said stator disc includes a plurality of coil windings divided into three groups, said groups being alternatively arranged over said stator disc, said coil windings in each group being serially connected together so that an A.C. current is produced from said generator assembly.

5. The apparatus, as recited in claim 1, further including a gear box assembly disposed between said fan assembly and said generator assembly so that the ratio of rotation of said fan assembly and said generator assembly may be selectively adjusted.

6. A method for converting exhaust air from a piece of machinery into electricity comprising the following steps:

a. selecting a piece of equipment that produces exhaust gas and delivers it through an exhaust opening;

b. selecting an exhaust gas electricity generator system that includes a fan assembly and a generator assembly coupled thereto, said fan assembly including two rotating discs and a plurality of vanes extending between said discs, said fan assembly being mounted adjacent to the exhaust opening so that said vanes are aligned transversely to the direction of flow of the exhaust gas, said generator assembly including an outer housing with two magnetic flat discs surrounding a flat center stator disc, said stator disc includes a plurality of coil members in which an electric current is created when said magnetic discs are rotated around said stator discs;

c. mounting said exhaust gas electricity generator system over said exhaust vent so that the exhaust gas flows into said fan assembly and rotates said vanes;

d. connected said generator assembly to an electricity distribution system; and, e. activating said piece of machinery to produce exhaust that is converted into electricity.

* * * * *